(12) United States Patent
Zhang et al.

(10) Patent No.: US 10,373,296 B2
(45) Date of Patent: Aug. 6, 2019

(54) METHOD AND SYSTEM FOR REDUCING RINGING ARTIFACTS IN X-RAY IMAGE

(71) Applicant: GENERAL ELECTRIC COMPANY, Schenectady, NY (US)

(72) Inventors: Zhaoxia Zhang, ShangHai (CN); Kun Tao, ShangHai (CN); Xiao Xuan, Beijing (CN); Ming Yan, ShangHai (CN); Han Kang, Beijing (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 66 days.

(21) Appl. No.: 15/481,191

(22) Filed: Apr. 6, 2017

(65) Prior Publication Data
US 2017/0294001 A1   Oct. 12, 2017

(30) Foreign Application Priority Data

Apr. 7, 2016  (CN) .......................... 2016 1 0213346

(51) Int. Cl.
*G06T 5/00* (2006.01)
*G06T 5/10* (2006.01)

(52) U.S. Cl.
CPC .............. *G06T 5/005* (2013.01); *G06T 5/10* (2013.01); *G06T 2207/10116* (2013.01)

(58) Field of Classification Search
None
See application file for complete search history.

(56) References Cited

U.S. PATENT DOCUMENTS

| 6,333,990 B1 | 12/2001 | Yazici et al. |
| 7,676,073 B2 | 3/2010 | Hamill et al. |
| 7,978,926 B2 | 7/2011 | Fairbanks et al. |
| 8,260,017 B2 | 9/2012 | Ohishi et al. |
| 8,929,507 B2 | 1/2015 | Moghe et al. |

(Continued)

FOREIGN PATENT DOCUMENTS

| EP | 2 860 692 A1 | 4/2015 |
| KR | 2007-0094179 A | 9/2007 |
| KR | 20110125696 A | 11/2011 |

OTHER PUBLICATIONS

Ashrafuzzaman, A.N.M., et al., "A Self-Adaptive Approach for the Detection and Correction of Stripes in the Sinogram: Suppression of Ring Artifacts in CT Imaging," Journal on Advances in Signal Processing, vol. 2011, Article ID. 183547, pp. 1-13 (2011).

(Continued)

*Primary Examiner* — Idowu O Osifade
(74) *Attorney, Agent, or Firm* — Fletcher Yoder, P.C.

(57) ABSTRACT

The present disclosure discloses a method for reducing ringing artifacts in an X-ray image, comprising: acquiring an X-ray image by scanning an object, wherein the X-ray image comprises grid line artifacts; applying a first bandwidth filter and a second bandwidth filter respectively to the X-ray image so as to obtain a filtered first image and a filtered second image, wherein the first bandwidth filter and the second bandwidth have different bandwidths; constructing a weighting map according to the X-ray image; and fusing the filtered first image and the filtered second image with the weighting map so as to obtain an output image. The present disclosure also discloses a system using the above method.

16 Claims, 9 Drawing Sheets

(56) References Cited

U.S. PATENT DOCUMENTS

2006/0182363 A1* 8/2006 Jellus .................. G01R 33/565
382/254
2008/0123816 A1    5/2008 Mori et al.
2008/0130823 A1    6/2008 Hagiwara
2012/0275563 A1   11/2012 Manak et al.

OTHER PUBLICATIONS

Prell, D., et al., "Comparison of ring artifact correction methods for flat-detector CT," Physics in Medicine and Biology, vol. 54, No. 12, pp. 3881-3895 (2009).
Raven, C., "Numerical removal of ring artifacts in microtomography," Review of Scientific Instruments, vol. 69, No. 8, pp. 2978-2980 (1998).
Combined Search and Examination Report issued in connection with corresponding GB Application No. 1704783.8 dated Aug. 29, 2017.
Kim et al., "Ringing Artifact Reduction for Metallic Objects in Direct Digital Radiography Detectors With Stationary Antiscatter Grids", Conference: Proc. SPIE 9033, Medical Imaging 2014: Physics of Medical Imaging, at San Diego, vol. 9033, 2014, 8 pages.

* cited by examiner

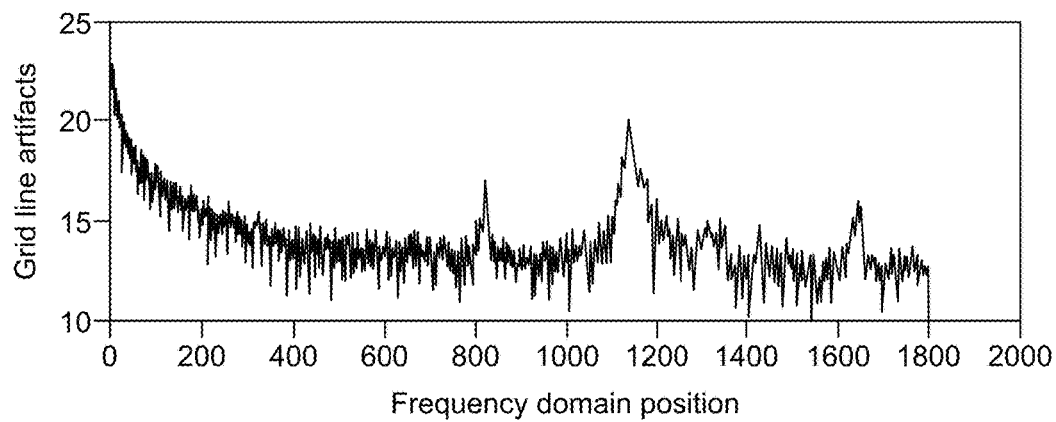
FIG. 5
FIG. 6
FIG. 7

METHOD AND SYSTEM FOR REDUCING RINGING ARTIFACTS IN X-RAY IMAGE

FIELD

The present disclosure generally relates to image processing techniques, and more particularly to a method and a system for reducing ringing artifacts in an X-ray image.

BACKGROUND

In a conventional X-ray image system, X-rays emitted from an X-ray source can pass through an object to be imaged, and primary beams of the X-rays can be incident upon a digital image detector so as to form a projected image in a digital radiography imaging. However, scattered beams are generated when the primary beams are passing through the object, and these scattered beams may reduce the image contrast and degrade the image quality. In order to remove these undesired scattered beams, anti-scatter grid array is typically used between the X-ray source and the image detector. A conventional anti-scatter grid array is composed of alternating stripes made of an X-ray transmission material such as aluminum or carbon and an X-ray absorbing material such as lead. The anti-scatter grid array preferentially transmits the primary beams of the X-rays and absorbs the scattered beams. However, due to the grid pattern of the X-ray absorbing material, the anti-scatter grid array will cast a shadow onto the image detector, and thus will form visible artifacts in the X-ray image, commonly referred to as grid line artifacts. In order to reduce the grid line artifacts, a band-stop filter can often be used. Such filtering in the frequency domain is in fact a process of convoluting the X-ray image in the spatial domain. However, while using the band-stop filter for filtering to reduce the grid line artifacts, ringing artifacts will be induced by the band-stop filter in the process of convolution due to the asymmetric intensity distribution on the X-ray image.

Therefore, it is necessary to further reduce the generation of the ringing artifacts in the X-ray image in the process of the grid line artifacts reduction, so as to improve the image quality.

SUMMARY

An aspect of the present disclosure provides a method for reducing ringing artifacts in an X-ray image. The method comprises: acquiring an X-ray image by scanning an object, wherein the X-ray image comprises grid line artifacts; applying a first bandwidth filter and a second bandwidth filter respectively to the X-ray image so as to obtain a filtered first image and a filtered second image, wherein the first bandwidth filter and the second bandwidth filter have different bandwidths; constructing a weighting map according to the X-ray image; and fusing the filtered first image and the filtered second image with the weighting map so as to obtain an output image.

Another aspect of the present disclosure provides a system for reducing ringing artifacts in an X-ray image. The system comprises an image acquisition device and a processor. The image acquisition device is configured to scan an object to acquire an X-ray image which comprises grid line artifacts. The processor comprises a first bandwidth filter, a second bandwidth filter, a weighting map constructing module and an image fusion module. The first bandwidth filter is configured to filter the X-ray image to obtain a filtered first image. The second bandwidth filter is configured to filter the X-ray image to obtain a filtered second image, wherein the first bandwidth filter and the second bandwidth filter have different bandwidths. The weighting map constructing module is configured to construct a weighting map according to the X-ray image. The image fusion module is configured to fuse the filtered first image and the filtered second image with the weighting map so as to obtain an output image.

BRIEF DESCRIPTION OF THE DRAWINGS

These and other features, aspects and advantages of the present disclosure can be understood better in light of the following detailed description with reference to the accompanying drawings, in which the same reference signs represent the same components in the whole drawings, in which:

FIG. 5 shows a partial one-dimensional X-ray image of FIG. 4;

FIG. 6 shows a schematic diagram of a first bandwidth filter with a smaller bandwidth in a frequency domain of the present disclosure;

FIG. 7 shows a schematic diagram of a second bandwidth filter with a larger bandwidth in the frequency domain of the present disclosure;

DETAILED DESCRIPTION

In order to help the person skilled in the art to exactly understand the subject matters claimed by the present disclosure, detailed description for embodiments of the present disclosure will be given with reference to the accompanying drawings in the following. In the following detailed description for those embodiments, some known functions or structures will not be described in details by the Description, to avoid disclosure of the present disclosure to be affected by unnecessary details.

Unless defined otherwise, the technical or scientific terms used in the Claims and the Description should have meanings as commonly understood by one of ordinary skilled in the art to which the present disclosure belongs. The terms "first", "second" and the like in the Description and the Claims do not mean any sequential order, quantity or importance, but are only used for distinguishing different components. The terms "a", "an" and the like do not denote a limitation of quantity, but denote the existence of at least one. The terms "comprises", "comprising", "includes", "including", "haves", "having" and the like mean that the element or object in front of the "comprises", "comprising", "includes", "including", "haves" and "having" covers the elements or objects and their equivalents illustrated following the "comprises", "comprising", "includes", "including", "haves" and "having" but do not exclude other elements or objects. The term "coupled" or "connected" or the like is not limited to being connected physically or mechanically, but may comprise electric connection, no matter directly or indirectly.

Figure 1:
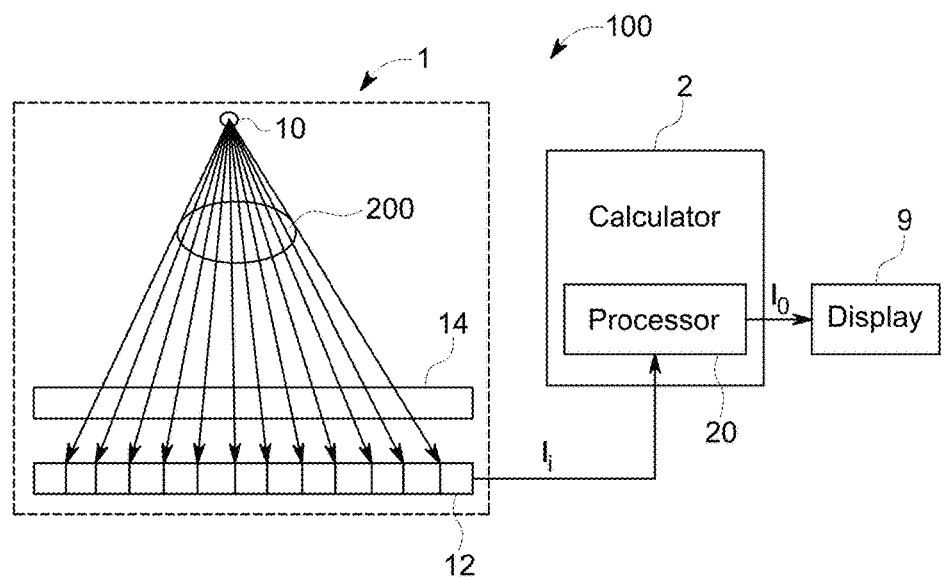
FIG. 1 is a schematic diagram of a schematic system for reducing ringing artifacts in an X-ray image according to an embodiment of the present disclosure.
Figure 3:
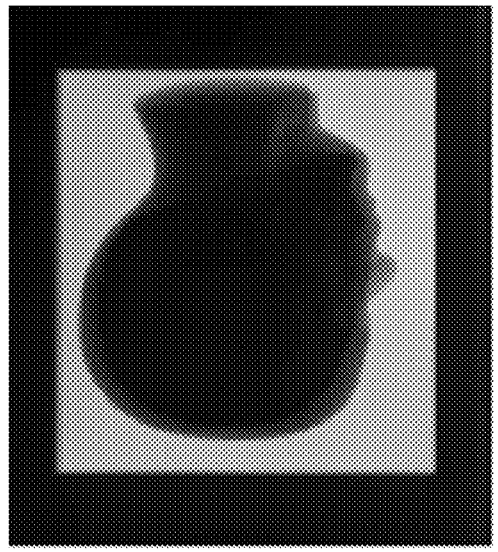
FIG. 3 shows an X-ray image that includes grid line artifacts in a spatial domain.

FIG. 1 shows a schematic diagram of a schematic system 100 for reducing ringing artifacts in an X-ray image according to an embodiment of the present disclosure. As shown in FIG. 1, the schematic system 100 may include an image acquisition device 1 and a computer 2 having a processor 20. The image acquisition device 1 may scan an object 200, such as a head of a patient, to acquire an X-ray image $I_i$. In an embodiment, the image acquisition device 1 may include an X-ray source 10 and a detector array 12. The X-rays emitted from the X-ray source 10 pass through the object 200 and cast onto the detector array 12, thereby the X-ray image $I_i$ is generated. There are grid line artifacts in the X-ray image $I_i$. For example, these grid line artifacts may be caused by an anti-scatter grid array 14 disposed between the object 200 and the detector array 12. FIG. 3 shows the X-ray image $I_i$ in a spatial domain that includes the grid line artifacts. The processor 20 may process the X-ray image $I_i$ to reduce ringing artifacts induced during the reduction of the grid line artifacts so as to generate an output image $I_o$. The system 100 may also include a display 9. The output image $I_o$ may be displayed on the display 9 for an operator to view.

Figure 2:
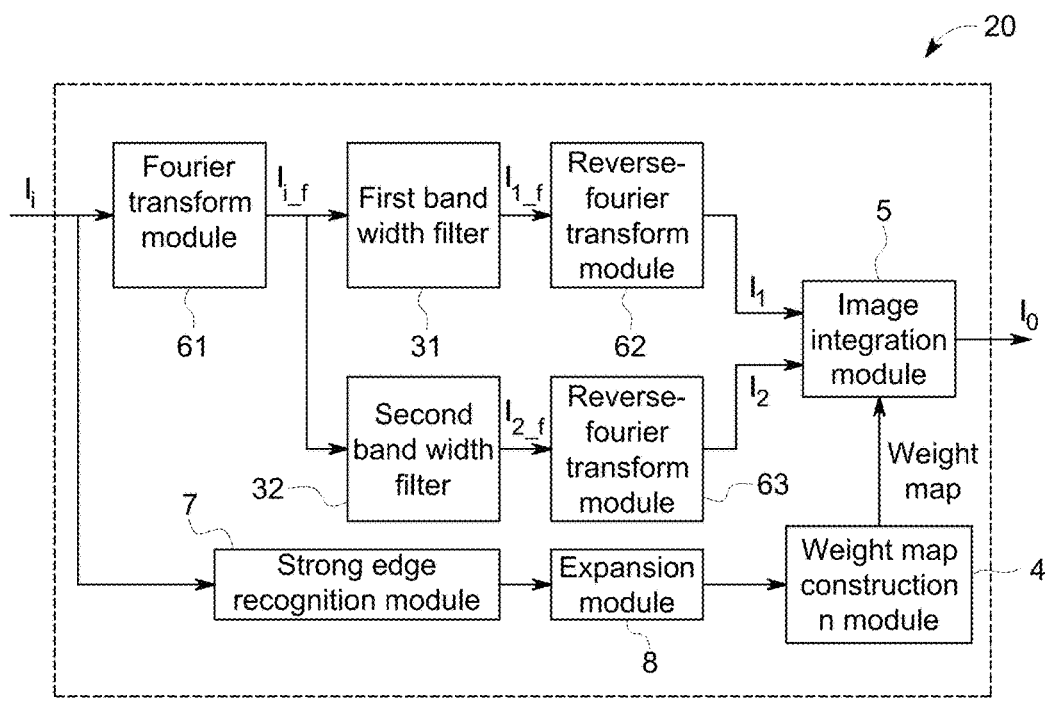
FIG. 2 is a schematic block diagram of an embodiment of a module executed in the processor of the computer of FIG. 1.

FIG. 2 shows a schematic block diagram of an embodiment of a module executed in the processor 20. It should be understood that execution modules in the processor 20 mentioned below may be virtual modules which may not really exist in the real system 100. As shown in FIG. 2, the processor 20 may include a first bandwidth filter 31, a second bandwidth filter 32, a weighting map constructing module 4 and an image fusion module 5.

The first bandwidth filter 31 and the second bandwidth filter 32 have different bandwidths respectively. For example, the first bandwidth filter 31 may have a smaller bandwidth and the second bandwidth filter 32 may have a larger bandwidth. The first bandwidth filter 31 may filter the X-ray image $I_i$ to obtain a filtered first image $I_1$. The second bandwidth filter 32 may filter the X-ray image $I_i$ to obtain a filtered second image $I_2$.

The weighting map constructing module 4 may construct a weighting map according to the X-ray image $I_i$. The image fusion module 5 may fuse the filtered first image $I_1$ and the filtered second image $I_2$ with the weighting map so as to obtain the output image $I_o$.

The system 100 filters the X-ray image $I_i$ by using the first bandwidth filter 31 with the smaller bandwidth and the second bandwidth filter 32 with the larger bandwidth respectively, and fuses the filtered first image $I_1$ from the first bandwidth filter 31 with the smaller bandwidth and the filtered second image $I_2$ from the second bandwidth filter 32 with the larger bandwidth according to the constructed weighting map appropriately, so that the ringing artifacts is further reduced while removing the grid line artifacts in the output image $I_o$, and more details can be retained in the output image $I_o$, therefore the output image $I_o$ has a higher image quality.

Figure 4:
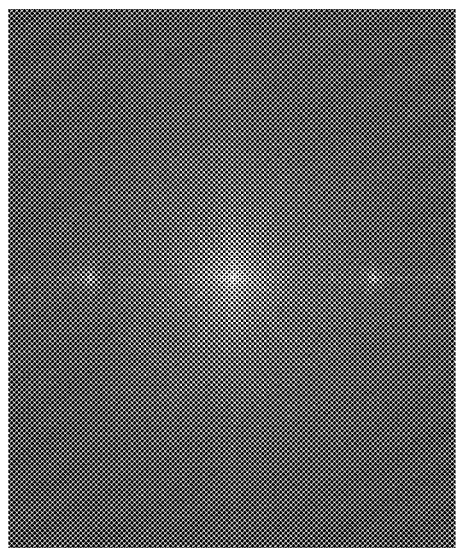
FIG. 4 shows an X-ray image in the frequency domain of FIG. 3.

The processor 20 may further includes a Fourier transform module 61 and an inverse Fourier transform module 62, 63. The first bandwidth filter 31 may be connected between the Fourier transform module 61 and the inverse Fourier transform module 62, and the second bandwidth filter 32 may be connected between the Fourier transform module 61 and the inverse Fourier transform module 63. The Fourier transform module 61 may receive the X-ray image $I_i$ from the image acquisition device 1, and perform a Fourier transform to convert the X-ray image $I_i$ in the spatial domain to an X-ray image in a frequency domain, $I_{i\_f}$. FIG. 4 shows the X-ray image in the frequency domain, $I_{i\_f}$, and FIG. 5 shows a partial one-dimensional X-ray image of FIG. 4.

The first bandwidth filter 31 and the second bandwidth filter 32 may be, for example, Gaussian band-stop filters. As shown in FIG. 4 and FIG. 5, a frequency peak of the grid line artifacts may be found from the X-ray image in the frequency domain, $I_{i\_f}$, then the bandwidths of the first bandwidth filter 31 and the second bandwidth filter 32 may be determined according to the frequency peak and a distribution of the grid line artifacts. For example, the bandwidths of the first bandwidth filter 31 and the second bandwidth filter 32 may be determined by using FWHM (Full Width at Half Maximum) according to the frequency peak of the grid line artifacts. As an example, for grid line artifacts at a frequency of 70 lp/cm (line pair/centimeter) and for image pixel sizes of 100 μm (microns), a center frequency of the grid line artifacts after aliasing (i.e., frequency peak of the grid line artifacts found in the X-ray image in the frequency domain, $I_{i\_f}$) is about 31 lp/cm, and then according to the center frequency of the grid line artifacts after aliasing which is 31 lp/cm, it may be determined that the gain of the first bandwidth filter 31 and the second bandwidth filter 32 is approximately 0.99, the bandwidth of the first bandwidth filter 31 is approximately 0.5, and the bandwidth of the second bandwidth filter 32 is approximately 1.0. After determining the gain and the bandwidths of the first bandwidth filter 31 and the second bandwidth filter 32, the first bandwidth filter 31 and the second bandwidth filter 32 may be designed according to the following equations.

$$H_1 = 1 - \text{Gain} \times \exp\left(-\frac{D^2}{2D_1^2}\right) \quad (1)$$

$$H_2 = 1 - \text{Gain} \times \exp\left(-\frac{D^2}{2D_2^2}\right) \quad (2)$$

In the above equations (1) and (2), $H_1$ represents the first bandwidth filter 31, $H_2$ represents the second bandwidth filter 32, Gain represents the gain of the first bandwidth filter 31 and the second bandwidth filter 32, $D_1$ represents the bandwidth of the first bandwidth filter 31, $D_2$ represents the bandwidth of the second bandwidth filter 32, and D represents a distance from individual pixel point of the X-ray image in the frequency domain, $I_{i\_f}$, to a center frequency point of the grid line artifacts after aliasing respectively.

Figure 8:
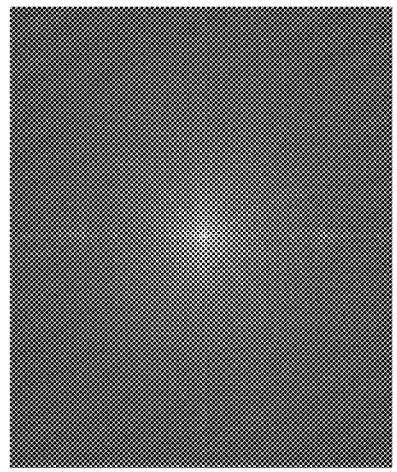
FIG. 8 shows a filtered first image in the frequency domain obtained by using the first bandwidth filter with the smaller bandwidth.
Figure 10:
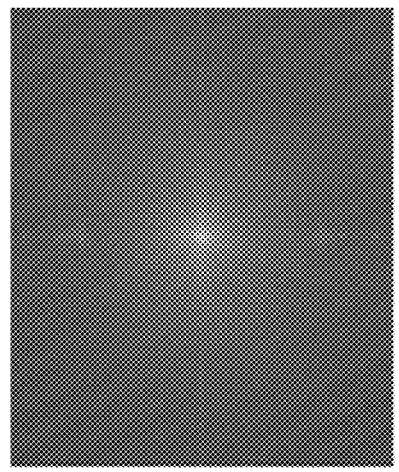
FIG. 10 shows a filtered second image in the frequency domain obtained by using the second bandwidth filter with the larger bandwidth.

FIG. 6 and FIG. 7 show the first bandwidth filter 31 with the smaller bandwidth and the second bandwidth filter 32 with the larger bandwidth in the frequency domain respectively. Returning to FIG. 2, the first bandwidth filter 31 may filter the X-ray image in the frequency domain, $I_{i\_f}$, as shown in FIG. 4, so as to obtain a filtered first image in the frequency domain, $I_{1\_f}$ as shown in FIG. 8. The second bandwidth filter 32 may filter the X-ray image in the frequency domain, $I_{i\_f}$, as shown in FIG. 4, so as to obtain a filtered second image in the frequency domain, $I_{2\_f}$, as shown in FIG. 10.

Figure 9:
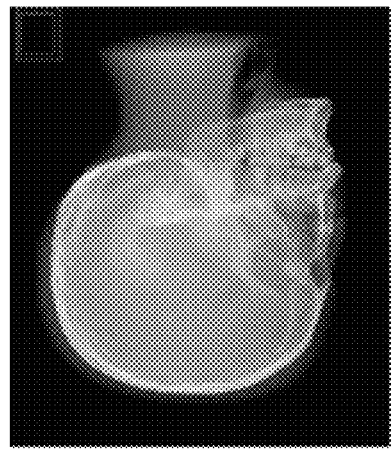
FIG. 9 shows a filtered first image in the spatial domain of FIG. 8.

The inverse Fourier transform module 62 may perform an inverse Fourier transform to convert the filtered first image in the frequency domain, $I_{1\_f}$, as shown in FIG. 8 back to the filtered first image in the spatial domain, $I_1$, as shown in FIG. 9. The inverse Fourier transform module 63 may perform an inverse Fourier transform to convert the filtered second image in the frequency domain, $I_{2\_f}$, as shown in FIG. 10 back to the filtered second image in the spatial domain, $I_2$, as shown in FIG. 11.

Figure 11:
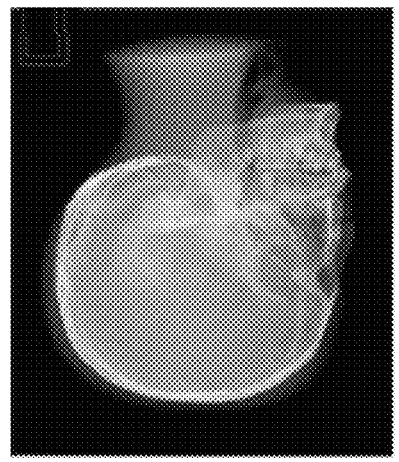
FIG. 11 shows a filtered second image in the spatial domain of FIG. 10.
Figure 12:
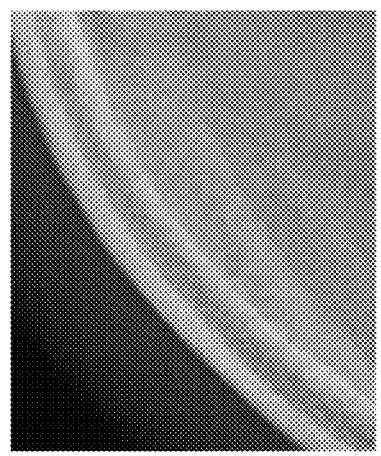
FIG. 12 shows an enlarged region of interest in the X-ray image of FIG. 3.
Figure 13:
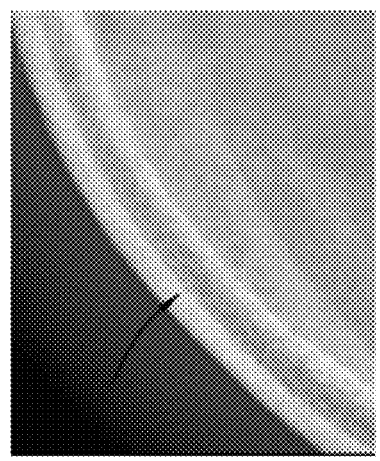
FIG. 13 shows an enlarged corresponding region of interest in the filtered first image of FIG. 9.
Figure 14:
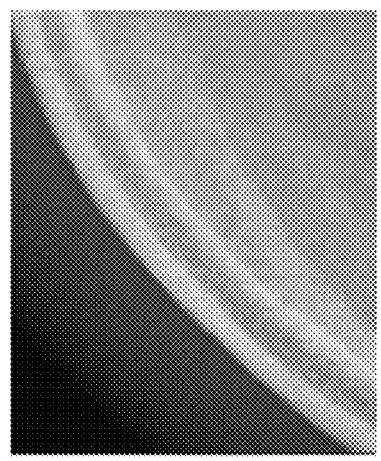
FIG. 14 shows an enlarged corresponding region of interest in the filtered second image of FIG. 11.

Referring to FIG. 12 to FIG. 14, FIG. 12 shows an enlarged region of interest (ROI) in the X-ray image $I_i$, wherein the grid line artifacts can be clearly observed in the original X-ray image $I_i$ as shown in FIG. 12; FIG. 13 shows an enlarged corresponding ROI in the filtered first image in the spatial domain, $I_1$, of FIG. 9, wherein the filtered first image $I_1$ from the first bandwidth filter 31 with the smaller bandwidth, as shown in FIG. 13, can retain more details, but the ringing artifacts can be observed, as indicated by the arrow in FIG. 13; FIG. 14 shows an enlarged corresponding ROI in the filtered second image in the spatial domain, $I_2$, of FIG. 11, wherein the filtered second image $I_2$ from the second bandwidth filter 32 with the larger bandwidth, as shown in FIG. 14, can remove the ringing artifacts, but lose more details.

Figure 17:
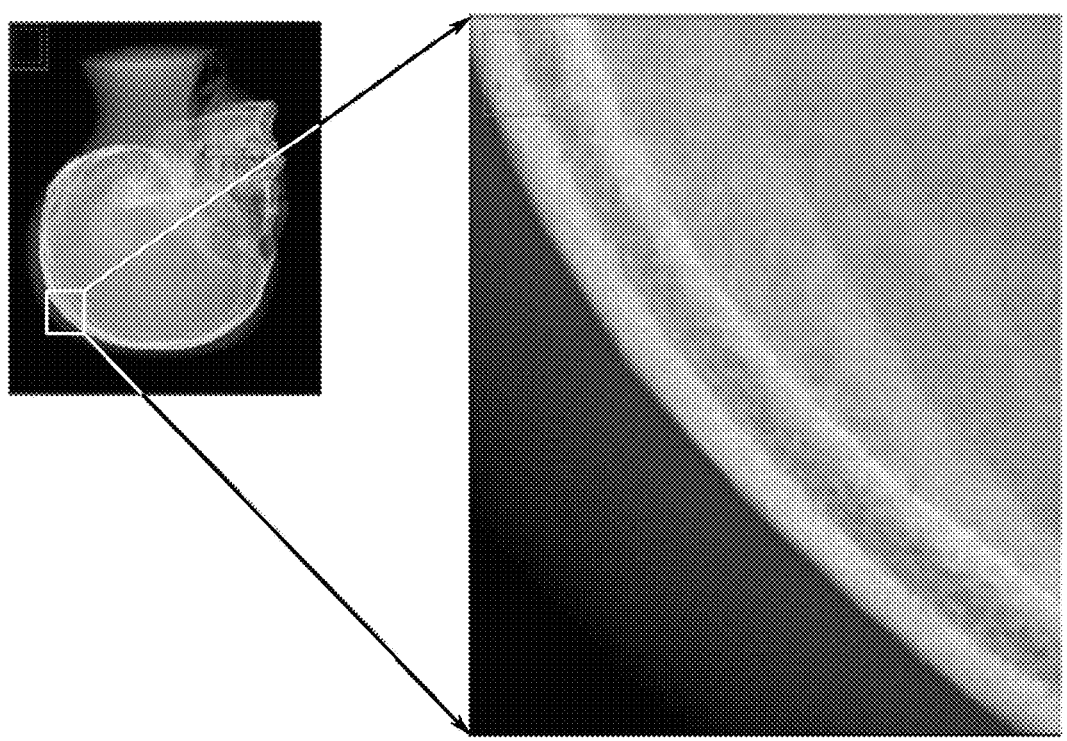
FIG. 17 shows an output image and an enlarged corresponding region of interest.

FIG. 17 shows the output image $I_o$ obtained after fusing the filtered first image $I_1$ as shown in FIG. 9 and the filtered second image $I_2$ as shown in FIG. 11 and its enlarged corresponding ROI. It can be seen from FIG. 17 that, in the fused output image $I_o$, not only the ringing artifacts is reduced, but also more details are retained, therefore the output image $I_o$ has a higher image quality.

Figure 15:
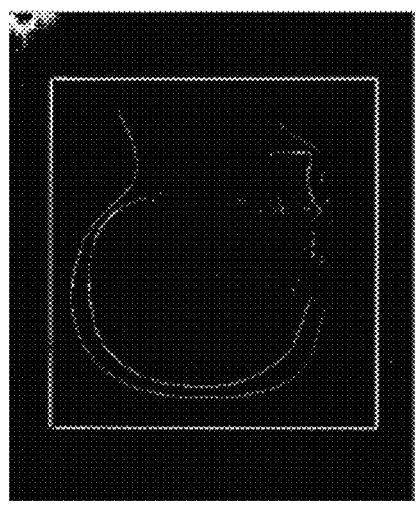
FIG. 15 shows an image of an area with an identified strong edge.

With continued reference to FIG. 2, the processor 20 may further include a strong edge identification module 7. The strong edge identification module 7 may identify a strong edge, such as the boundary of human skull, in the X-ray image $I_i$ as shown in FIG. 3. FIG. 15 shows an image of an area with the identified strong edge. The strong edge identification module 7 may calculate gradients of individual areas in the X-ray image $I_i$, select high gradient areas, and identify the selected high gradient areas as the strong edge. As an example, the strong edge identification module 7 may compare the calculated gradients of individual areas with a predetermined gradient threshold (e.g. 600), and select areas with higher gradients than the predetermined gradient threshold as the high gradient areas.

In an embodiment of the present disclosure, after the strong edge is identified by the strong edge identification module 7, the weighting map constructing module 4 may construct the weighting map based on the identified strong edge.

Figure 16:
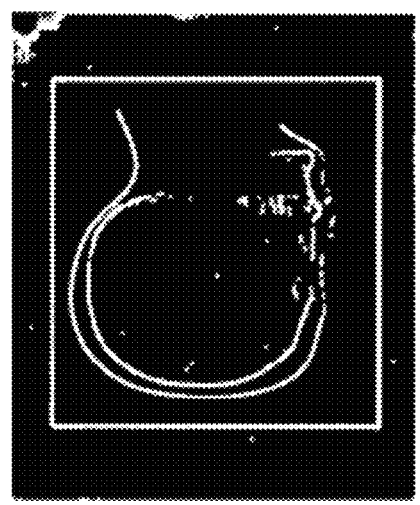
FIG. 16 shows an image of the area with the strong edge after dilation of FIG. 15.

Since the ringing artifacts area is generally larger than the strong edge area, as shown in FIG. 2, in order to cover the whole potential ringing artifacts area, the processor 20 may further include a dilation module 8. The dilation module 8 may dilate the area with the identified strong edge, and FIG. 16 shows an image of the area with the strong edge after dilation. In this case, the weighting map constructing module 4 may construct the weighting map based on the dilated area with the strong edge as shown in FIG. 16.

The image fusion module 5 may fuse the filtered first image $I_1$ and the filtered second image $I_2$ with the weighting map according to the following equation so as to obtain the output image $I_o$ as shown in FIG. 17.

$$I_o = I_1 \times w_1 + I_2 \times w_2 = I_1 \times w + I_2 \times (1-w) \quad (3)$$

In the above equation (3), $w_1$ represents a weighting value of the filtered first image $I_1$, $w_2$ represents a weighting value of the filtered second image $I_2$, and w represents a weighting value in the weighting map.

During the process that the image fusion module 5 fuses the filtered first image $I_1$ and the filtered second image $I_2$, for high gradient areas of the X-ray image $I_i$, the image fusion module 5 may make the weighting value $w_2$ of the filtered second image $I_2$ larger than the weighting value $w_1$ of the filtered first image $I_1$; while for other areas of the X-ray image $I_i$, the image fusion module 5 may make the weighting value $w_1$ of the filtered first image $I_1$ larger than the weighting value $w_2$ of the filtered second image $I_2$, so that more details can be retained in the output image $I_o$ while removing the ringing artifacts, thus the quality of the output image $I_o$ is improved.

Figure 18:
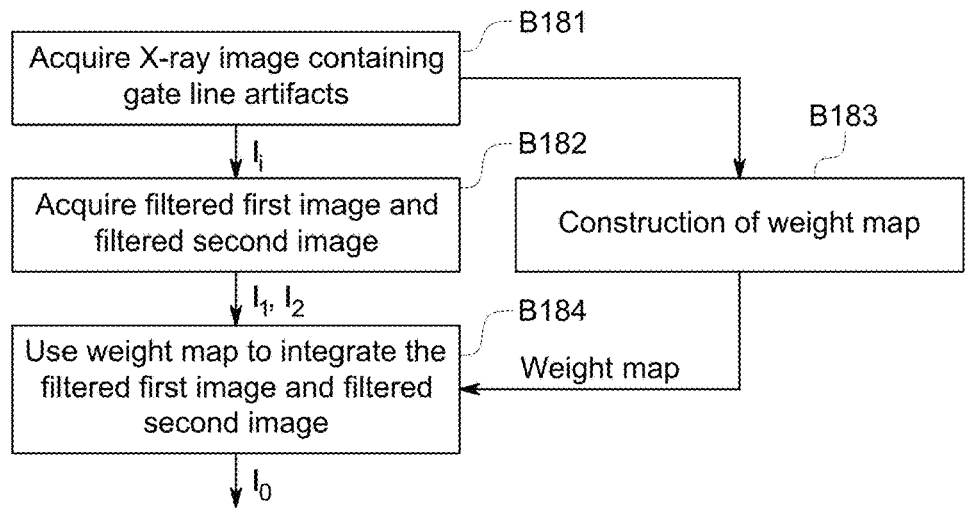
FIG. 18 is a flowchart of a schematic method for reducing ringing artifacts in an X-ray image according to an embodiment of the present disclosure.

The present disclosure also provides a method for reducing ringing artifacts in an X-ray image. FIG. 18 shows a flowchart of a schematic method for reducing the ringing artifacts in an X-ray image according to an embodiment of the present disclosure.

In block B181 of FIG. 18, an X-ray image $I_i$ of a human head, for example, may be acquired by scanning an object 200, wherein the X-ray image $I_i$ includes grid line artifacts as shown in FIG. 3.

In block B182, the X-ray image $I_i$ shown in FIG. 3 may be filtered by using a first bandwidth filter 31 with a smaller bandwidth (as shown in FIG. 6) and a second bandwidth filter 32 with a larger bandwidth (as shown in FIG. 7) respectively, so as to obtain a filtered first image $I_1$ (as shown in FIG. 8 and FIG. 9) and a filtered second image $I_2$ (as shown in FIG. 10 and FIG. 11).

In an implement of the present disclosure, a Fourier transform may be firstly performed to convert the X-ray image $I_i$ in a spatial domain as shown in FIG. 3 to an X-ray image in a frequency domain, $I_{i\_f}$ as shown in FIG. 4. Then, the X-ray image in the frequency domain, $I_{i\_f}$ as shown in FIG. 4 is filtered by using the first bandwidth filter 31 with the smaller bandwidth and the second bandwidth filter 32 with the larger bandwidth respectively, so that a filtered first image in the frequency domain, $I_{1\_f}$ (as shown in FIG. 8) and a filtered second image in the frequency domain, $I_{2\_f}$ (as shown in FIG. 10) are obtained. Finally, inverse Fourier transforms are performed to convert the filtered first image in the frequency domain, $I_{1\_f}$ as shown in FIG. 8 and the filtered second image in the frequency domain, $I_{2\_f}$ as shown in FIG. 10 back to the spatial domain, so as to obtain the filtered first image in the spatial domain, $I_1$, as shown in FIG. 9 and the filtered second image in the spatial domain, $I_2$, as shown in FIG. 11. Here, the bandwidths of the first bandwidth filter 31 and the second bandwidth filter 32 may be determined according to a frequency peak and a distribution of the grid line artifacts found from the X-ray image in the frequency domain, $I_{i\_f}$, shown in FIG. 4 and FIG. 5.

In block B183, a weighting map may be constructed according to the X-ray image $I_i$ shown in FIG. 3.

Below, how to construct the weighting map in block B183 of FIG. 18 will be described in detail with reference to FIG. 19.

Figure 19:
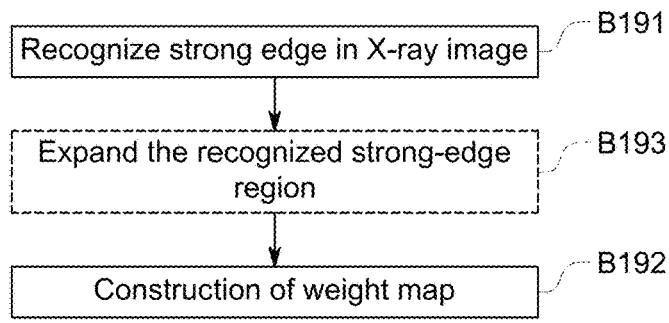
FIG. 19 shows steps of how to construct a weighting map in FIG. 18.

As shown in FIG. 19, in block B191, a strong edge is identified in the X-ray image $I_i$ as shown in FIG. 3, and FIG. 15 shows an area with an identified strong edge.

Figure 20:
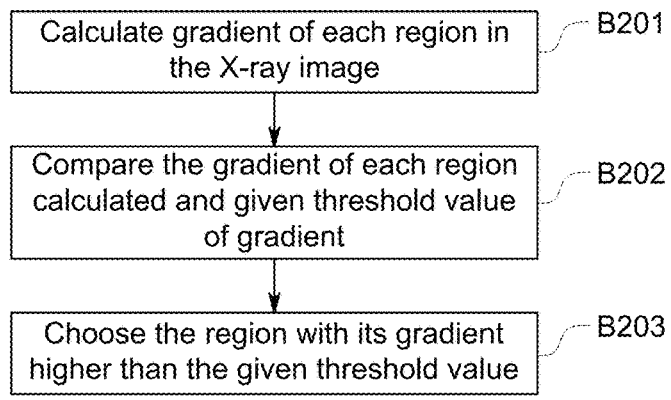
FIG. 20 shows steps of how to identify a strong edge in FIG. 19.

Furthermore, how to identify the strong edge in block B191 of FIG. 19 will be described in detail with reference to FIG. 20. As shown in FIG. 20, in block B201, gradients of individual areas in the X-ray image $I_i$ are calculated. In block B202, the calculated gradients of individual areas are compared with a predetermined gradient threshold (e.g. 600). In block 203, areas with higher gradients than the predetermined gradient threshold are selected as high gradient areas, and the selected high gradient areas are identified as the strong edge.

Returning to FIG. 19, in block B192, a weighting map is constructed according to the identified strong edge as shown in FIG. 15.

Since the ringing artifacts area is generally larger than the strong edge area, in an optional embodiment, the step of constructing the weighting map may further include an optional block B193 after block B191, so as to cover the whole potential ringing artifacts area. In the optional block B193, the area with the identified strong edge as shown in FIG. 15 may be dilated, and FIG. 16 shows an area with the strong edge after dilation.

In the case that block B193 for dilating the area with the identified strong edge is included, the weighting map in block B192 may be constructed according to the dilated area with the strong edge as shown in FIG. 16.

Returning to FIG. 18, in block B184, the filtered first image $I_1$ as shown in FIG. 9 and the filtered second image $I_2$ as shown in FIG. 11 are fused with the weighting map constructed in block B183, so as to obtain a fused output image $I_o$ as shown in FIG. 17.

During the process of image fusion, for high gradient areas of the X-ray image the filtered second image $I_2$ has a larger weighting value than the filtered first image $I_1$, for other areas of the X-ray image $I_2$ the filtered first image $I_1$ has a larger weighting value than the filtered second image $I_2$.

The method of the present disclosure filters the X-ray image $I_i$ by using the first bandwidth filter 31 with the smaller bandwidth and the second bandwidth filter 32 with the larger bandwidth respectively, and fuses the filtered first image $I_1$ from the first bandwidth filter 31 with the smaller bandwidth and the filtered second image $I_2$ from the second bandwidth filter 32 with the larger bandwidth according to the constructed weighting map from the X-ray image $I_i$ appropriately, so that the ringing artifacts is further reduced while removing the grid line artifacts in the output image $I_o$, and more details can be retained in the output image $I_o$, therefore using the method of the present disclosure, the quality of the output image $I_o$ can be improved.

Although the operation of the method for reducing ringing artifacts in an X-ray image according to the embodiment of the present disclosure is shown as functional blocks, the order of the individual functional blocks shown in FIGS. 18 to 20 and the separation of the operations between the individual functional blocks is not intended to be limiting. For example, the individual functional blocks may be executed in different orders, and the operation associated with one functional block may be combined with one or more other functional blocks or may be subdivided into multiple functional blocks.

Although the present disclosure has been set forth in details in combination with specific embodiments, the person skilled in the art shall be understood that many modifications and variations may be made to the present disclosure. Therefore, it should be recognized that the intention of the claims is to cover all these modifications and variations within the real concept and range of the present disclosure.

What is claimed is:

1. A method for reducing ringing artifacts in an X-ray image, comprising:
   acquiring an X-ray image by scanning an object, wherein the X-ray image comprises grid line artifacts;
   applying a first bandwidth filter and a second bandwidth filter respectively to the X-ray image so as to obtain a filtered first image and a filtered second image, wherein the first bandwidth filter and the second bandwidth filter have different bandwidths;
   constructing a weighting map according to the X-ray image; and
   fusing the filtered first image and the filtered second image with the weighting map so as to obtain an output image.

2. The method of claim 1, wherein applying the first bandwidth filter and the second bandwidth filter respectively to the X-ray image comprises:
   performing a Fourier transform to convert the X-ray image in a spatial domain to an X-ray image in a frequency domain;
   applying the first bandwidth filter and the second bandwidth filter respectively to the X-ray image in the frequency domain so as to obtain a filtered first image and a filtered second image in the frequency domain; and
   performing an inverse Fourier transform to convert the filtered first image and the filtered second image in the frequency domain back to the spatial domain.

3. The method of claim 2, further comprising:
   finding a frequency peak of the grid line artifacts from the X-ray image in the frequency domain; and
   determining the bandwidths of the first and the second bandwidth filters according to the frequency peak and a distribution of the grid line artifacts.

4. The method of claim 1, wherein constructing the weighting map according to the X-ray image comprises:
   identifying a strong edge in the X-ray image; and
   constructing the weighting map based on the identified strong edge.

5. The method of claim 4, further comprising:
   dilating an area of the identified strong edge to cover a whole ringing artifacts area,
   wherein constructing the weighting map based on the identified strong edge comprises: constructing the weighting map based on the dilated area of the strong edge.

6. The method of claim 4, wherein identifying the strong edge comprises:
   calculating gradients of individual areas in the X-ray image; and
   selecting high gradient areas as the strong edge.

7. The method of claim 6, wherein selecting the high gradient areas as the strong edge comprises:
   comparing the calculated gradients of individual areas with a predetermined gradient threshold; and selecting areas with higher gradients than the predetermined gradient threshold as the high gradient areas.

8. The method of claim 6, wherein the first bandwidth filter has a smaller bandwidth and the second bandwidth filter has a larger bandwidth, and wherein fusing the filtered first image and the filtered second image with the weighting map comprises:

during the image fusion, for the high gradient areas of the X-ray image, the filtered second image having a larger weighting value than the filtered first image; and for other areas of the X-ray image, the filtered first image having a larger weighting value than the filtered second image.

9. A system for reducing ringing artifacts in an X-ray image, comprising:

an image acquisition device configured to scan an object to acquire an X-ray image which comprises grid line artifacts; and a processor comprising:

a first bandwidth filter configured to filter the X-ray image to obtain a filtered first image;

a second bandwidth filter configured to filter the X-ray image to obtain a filtered second image, wherein the first bandwidth filter and the second bandwidth filter have different bandwidths;

a weighting map constructing module configured to construct a weighting map according to the X-ray image; and an image fusion module configured to fuse the filtered first image and the filtered second image with the weighting map so as to obtain an output image.

10. The system of claim 9, wherein the processor further comprises a Fourier transform module and an inverse Fourier transform module, wherein the Fourier transform module is configured to perform a Fourier transform to convert the X-ray image in a spatial domain to an X-ray image in a frequency domain;

the first and the second bandwidth filters are respectively configured to filter the X-ray image in the frequency domain so as to obtain a filtered first image and a filtered second image in the frequency domain; and the inverse Fourier transform module is configured to perform an inverse Fourier transform to convert the filtered first image and the filtered second image in the frequency domain back to the spatial domain.

11. The system of claim 10, wherein the bandwidths of the first and the second bandwidth filters are determined according to a frequency peak and a distribution of the grid line artifacts found from the X-ray image in the frequency domain.

12. The system of claim 9, wherein the processor further comprises:

a strong edge identification module configured to identify a strong edge in the X-ray image, wherein the weighting map constructing module is configured to construct the weighting map based on the identified strong edge.

13. The system of claim 12, further comprising:

a dilation module configured to dilate an area of the identified strong edge so as to cover a whole ringing artifacts area, wherein the weighting map constructing module is configured to construct the weighting map based on the dilated area of the strong edge.

14. The system of claim 12, wherein the strong edge identification module is configured to:

calculating gradients of individual areas in the X-ray image; and selecting high gradient areas as the strong edge.

15. The system of claim 14, wherein the strong edge identification module is configured to:

compare the calculated gradients of individual areas with a predetermined gradient threshold; and select areas with higher gradients than the predetermined gradient threshold as the high gradient areas.

16. The system of claim 14, wherein the first bandwidth filter has a smaller bandwidth and the second bandwidth filter has a larger bandwidth, and wherein during the image fusion of the image fusion module, the image fusion module is configured to make the filtered second image have a larger weighting value than the filtered first image for the high gradient areas of the X-ray image, and make the filtered first image have a larger weighting value than the filtered second image for other areas of the X-ray image.

* * * * *